United States Patent
Götschhofer

(10) Patent No.: US 6,994,197 B2
(45) Date of Patent: Feb. 7, 2006

(54) CLUTCH ELEMENT FOR A UNIT DRIVEN VIA A DRIVE SHAFT

(75) Inventor: Alfred Götschhofer, Molln (AT)

(73) Assignee: TCG Unitech Systemtechnik GmbH, Micheldorf (AT)

( * ) Notice: Subject to any disclaimer, the term of this patent is extended or adjusted under 35 U.S.C. 154(b) by 4 days.

(21) Appl. No.: 10/817,946

(22) Filed: Apr. 6, 2004

(65) Prior Publication Data

US 2004/0238316 A1    Dec. 2, 2004

(30) Foreign Application Priority Data

Jun. 2, 2003   (EP) .................................. 03450140

(51) Int. Cl.
    F16D 43/25    (2006.01)
    F16D 13/06    (2006.01)
    F16D 13/64    (2006.01)

(52) U.S. Cl. ........................... 192/107 M; 192/107 R; 192/107 T; 192/65; 192/82 T; 192/103 R

(58) Field of Classification Search ............... 192/65, 192/82 T, 103 B, 107 R, 107 T, 113.36
    See application file for complete search history.

(56) References Cited

U.S. PATENT DOCUMENTS

| | | | |
|---|---|---|---|
| 2,019,153 A * | 10/1935 | Meyer et al. | 192/103 B |
| 2,655,015 A | 10/1953 | Linder | |
| 2,840,315 A | 6/1958 | Heiss | |
| 2,987,158 A * | 6/1961 | Kiekhaefer | 192/105 BA |
| 3,105,580 A | 10/1963 | Settimi | |
| 3,712,438 A * | 1/1973 | Roddy et al. | 192/105 CD |
| 3,718,214 A * | 2/1973 | Newman | 192/105 CD |
| 4,016,964 A * | 4/1977 | Dietzsch et al. | 192/105 CD |
| 4,522,290 A * | 6/1985 | Klink | 192/107 M |
| 4,868,437 A * | 9/1989 | Wagner et al. | 310/78 |
| 4,889,215 A | 12/1989 | Ohkanda | |
| 4,917,225 A | 4/1990 | Diehl et al. | |
| 2003/0106761 A1 * | 6/2003 | Taylor | 192/41 R |

FOREIGN PATENT DOCUMENTS

| | | |
|---|---|---|
| EP | 0363013 | 4/1990 |
| GB | 720168 | 12/1954 |
| GB | 938532 | 10/1962 |
| GB | 1315747 | 5/1973 |
| JP | 62153596 | 7/1987 |

* cited by examiner

Primary Examiner—Richard M. Lorence
(74) Attorney, Agent, or Firm—Dykema Gossett PLLC

(57) ABSTRACT

A clutch element for a unit is driven via a drive shaft, especially for a water pump. The clutch element comprises a temperature- and/or speed-sensitive clutch member which is rigidly connected with the drive shaft and which acts on a part of the unit to be driven depending on the temperature and/or rotational speed, with the clutch member being formed by a clutch disk whose surface forms at least one clutch surface for non-positive connection with a respective counter-surface which is formed by a surface of the part to be driven. At least one clutch surface comprises at least one drainage groove.

32 Claims, 1 Drawing Sheet

CLUTCH ELEMENT FOR A UNIT DRIVEN VIA A DRIVE SHAFT

BACKGROUND OF THE INVENTION

The invention relates to a clutch element for a unit driven via a drive shaft, especially for a water pump, with the clutch element comprising a temperature and/or speed-sensitive clutch member which is rigidly connected with the drive shaft and which acts on a part of the unit to be driven depending on the temperature and/or rotational speed, with the clutch member being formed by a clutch disk whose outer jacket surface forms at least one first clutch surface for non-positive connection with a respective counter-surface which is formed by an inner jacket surface of the part to be driven.

DESCRIPTION OF THE PRIOR ART

From JP 60295904 A a water pump is known, comprising a main and secondary impeller, with the main and secondary impeller being arranged coaxially with respect to a drive shaft. The main impeller is rigidly connected to a drive shaft. The secondary impeller is held rotationally on the main impeller, with a temperature-sensitive clutch part being disposed between main and secondary impeller. A rotational connection is produced between the main impeller and the secondary impeller from a predefined minimum temperature, so that the secondary impeller is driven together with the main impeller. In this way the conveying output of the water pump can be adjusted to the required cooling output. The water pump requires a relatively high effort with respect to production.

From U.S. Pat. No. 4,917,225 A a thermally responsive centrifugal clutch is known. The clutch comprises a speed-sensitive ring which produces a slippage between the clutch part from a predetermined speed of the drive shaft in order to avoid exceeding a maximum drive speed for a unit.

U.S. Pat. No. 3,105,580 A shows a thermostatically controlled clutch which comprises a thermally sensitive element in order to operate a fan at a predetermined temperature. The temperature-sensitive element is adapted as a bimetal which presses a clutch band in a non-positive manner against a clutch surface of a clutch drum. In addition to the high amount of effort concerning construction and production, the clutch has the disadvantage that it is unsuitable for units which are subjected to corrosive influences such as water pumps.

U.S. Pat. No. 2,655,015 A describes a thermally responsive multi-disk clutch with clutch disks which are pressed onto each other by a thermally responsive element with a higher coefficient of expansion. This clutch is also very complex from a constructional point of view.

From U.S. Pat. No. 2,840,315 A a thermostatically controlled fan is known which is driven via a clutch plate by a belt drive. The clutch device comprises a thermostatic element which allows a spring part to act upon the clutch plate in a stronger or weaker way depending on the temperature, so that at a low temperature the fan is driven under sliding friction of the clutch plate, i.e. by forming a certain slippage relative to the drive shaft. At a higher temperature the fan is connected in a non-positive way with the drive shaft and revolves synchronously with the same. In addition to the high constructional complexity, this clutch device comes with the disadvantage that a relatively large amount of constructional space is required.

From U.S. Pat. No. 1,315,747 A a clutch device is known for a radiator fan, with the clutch comprising a temperature-sensitive element with a material expanding under a thermal influence such as wax or rubber.

GB 720 168 A discloses a centrifugal clutch with a number of mutually spaced clutch blocks which are pressed apart under the influence of centrifugal force and are thus pressed against a clutch drum. The clutch blocks are driven by an annular clutch element which is connected with the clutch blocks via an annular rubber body.

GB 938 532 A shows a further centrifugal clutch in which a disk-like clutch body is pressed outwardly under the influence of centrifugal force against a clutch drum, with the rubber body also being pressed outwardly by a star-like drive element. Further centrifugal clutches are known from EP 0 363 013 A1 and U.S. Pat. No. 4,889,215 A, with the clutch elements being pressed elastically to the outside against a clutch drum.

The known centrifugal and thermal clutch elements are configured as dry clutches and are not suitable for wet use such as for driving a water pump, with the clutch surfaces being subjected at least occasionally to a liquid such as water for example. Clutches configured for dry use would fail in wet use because a carrying liquid film would form between the clutch surfaces and would thus produce an effect also known as "aquaplaning".

SUMMARY OF THE INVENTION

It is the object of the present invention to develop a temperature-responsive clutch element which can be produced with as little effort as possible and requires little constructional space. Moreover, the clutch element is to require little maintenance and should be as insensitive as possible to corrosive media.

This is achieved in accordance with the invention in such a way that the first and/or second clutch surface comprises at least one drainage groove. Drainage grooves of this kind are especially advantageous when the clutch element is used for water pumps. The so-called "aquaplaning" effect can thus be avoided. Moreover, drainage grooves on the clutch surface are also used for receiving and removing possible particles in the water circulation.

The relevant aspect is that a material is chosen for the clutch disk which is subject to the highest possible change in volume at temperature differences in the desired operating range. It is preferably provided in this respect that the material of the clutch disk has a higher coefficient of thermal expansion than the drive shaft and/or the part to be driven.

The part to be driven (such as the impeller of a water pump for example) is advantageously held in a rotatable way on the drive shaft and is uncoupled from the drive shaft below a predefined minimum rotational speed of the drive shaft and below a predefined minimum temperature. In the cold state, and in the low speed range, the clutch disk has a precisely defined gap between the clutch surface of the clutch disk and a respective counter-surface of the part to be driven. If the temperature of the clutch disk and/or the rotational speed of the drive shaft exceed a predefined minimum value, a clutching of the clutch element occurs. A rise in the temperature produces an expansion and thus a clutching of the clutch disk.

Depending on the choice of the material for the clutch disk, the responsiveness can be varied between thermal and speed responsiveness. A merely thermally dependent clutch function can be achieved by a thermoplastic or metallic material for the clutch disk. In the latter case it is also possible to use a sintered metal such as sintered bronze.

In addition to the thermal dependence, a speed dependence can be achieved in an especially advantageous way when the clutch disk consists at least in part of an elastomer, preferably acrylonitrile-butadiene caoutchouc, acrylate caoutchouc, ethylene-propylene caoutchouc, silicone caoutchouc, fluorocaoutchouc or the like. A rise in the temperature of the clutch disk produces an expansion of the material and thus a clutching of the clutch disk. If this is made of an elastomeric material, the material is softened by the temperature and ensures an easy expansion by centrifugal force and an earlier entrainment of the part to be driven. In the case of an optimal configuration of the clutch element it is also possible to achieve a slip regulation at high rotational speeds and/or high torques.

It is preferably provided that the clutch surface is provided with a wear-proof arrangement. A wear-proof surface can be achieved by spraying or vulcanizing the clutch surface.

An increase in the speed responsiveness of the clutch disk can be achieved when the clutch disk is segmented in the circumferential direction. It is preferably provided that the segmenting is formed by indentations which extend from the clutch surface into an inner region of the clutch disk, preferably in a radial or spiral manner. The segmenting ensures that the individual radial segments of the clutch disk are pressed outwardly in a sufficiently radial way under the influence of centrifugal force even at relatively low speeds and a clutching of the clutch disk is produced with the part to be driven.

In a further embodiment it is provided that the drive shaft and the clutch disk are connected with each other in a positive-locking manner. A secure drive of the clutch disk is thus ensured. It is especially advantageous when a first face side of the clutch disk forms a second clutch surface for the non-positive connection with a respective second counter-surface formed by a face surface of the part to be driven. This allows an especially favorable transmission of torque. It can further be provided that a supporting disk which is rigidly connected with the drive shaft is arranged in the region of at least one face side of the clutch disk. The supporting disk prevents that the clutch disk yields in the axial direction and denting of the clutch disk occurs.

When the clutch disk consists of an elastomeric material, a Shore hardness of between 60 and 70 has proven to be advantageous.

The clutch element in accordance with the invention consists of very few individual parts and requires very little constructional space. This allows arranging the clutch element within a housing of a unit, especially within a water pump housing.

BRIEF DESCRIPTION OF THE DRAWINGS

The invention is now explained below in closer detail by reference to the enclosed drawings, wherein.

DETAILED DESCRIPTION OF THE PREFERRED EMBODIMENT

Figure 1:
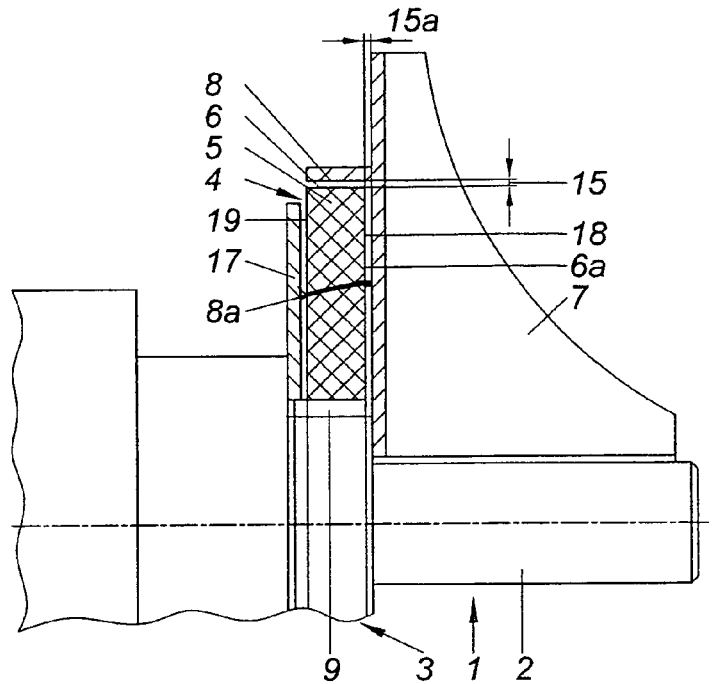
FIG. 1 shows a clutch element in accordance with the invention in a longitudinal sectional view.

A unit 1 which is formed in the embodiment by a water pump is driven by a drive shaft 2 via a clutch element 3. The clutch element 3 comprises a temperature- and/or speed-dependent clutch member 4 which is connected with the drive shaft 2 in a positive-locking manner. The clutch member 4 is formed by a clutch disk 5 whose outside jacket surface forms a first clutch surface 6. The part 7 which is to be driven and is formed in the embodiment by an impeller comprises a respective first counter-surface 8 upon which the first clutch surface 6 acts in the clutched state.

Figures 2, 3:
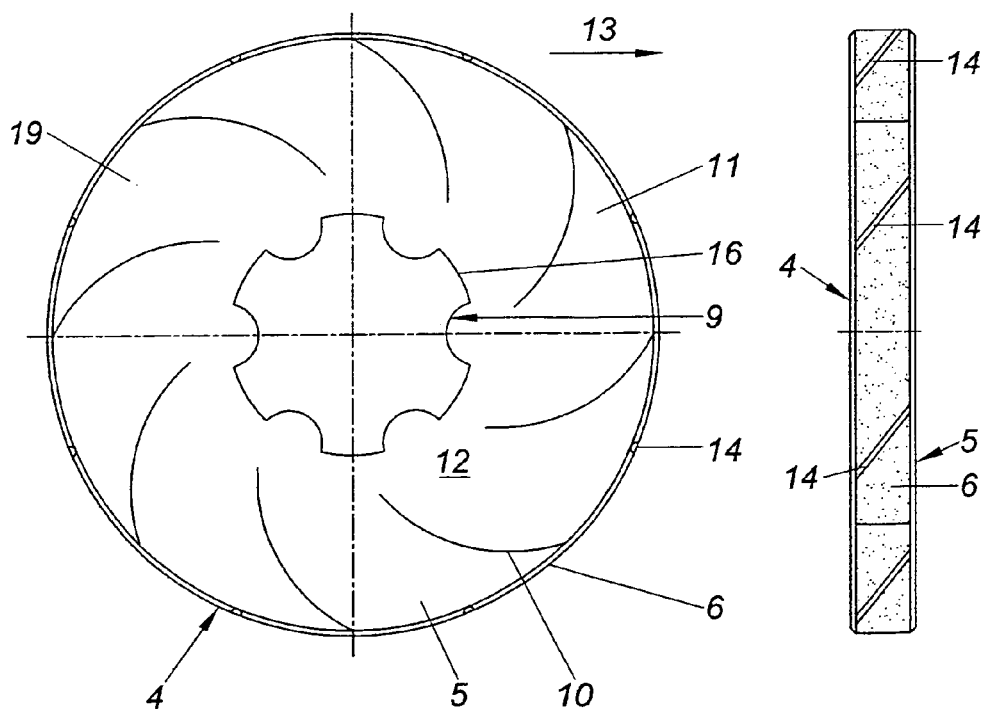
FIG. 2 shows a clutch disk of the clutch element in a front view.
FIG. 3 shows a clutch disk in a side view.

The positive-locking connection 9 between the clutch disk 5 and the drive shaft 2 can be achieved by a gearing or a respective profiling of the hub 16, as is shown in particular in FIG. 2.

A material with the highest possible coefficient of thermal expansion in the desired temperature range of between −40° C. and 150° for example is chosen as the material for the clutch disk 5. The clutch disk 5 can consist of elastomers, thermoplastics or metals for example. The extent of the responsiveness to temperature and rotational speed can be set by the choice of the material. Clutch disks 5 made of thermoplastic materials and metals are suitable for purely thermal functions. Clutch disks made of metal are resistant to abrasion and are resistant to high stress. Sintered metal such as sintered bronze can be used.

Clutch disks 5 made of elastomeric materials are suitable when both a thermally dependent as well as speed-dependent clutch function is desired. The frictional connection occurs both via the thermal expansion as well as via the centrifugal expansion of the clutch disk 5. For the purposes of higher stresses the first clutch surface 6 may optionally be provided with a wear-proof arrangement, e.g. by spraying or vulcanizing a wear-proof material.

It is especially advantageous for the speed responsiveness of the clutch disk 5 when the clutch disk 5 is segmented along its first clutch surface 6 around the circumference and comprises bucket-like indentations 10 between the clutch surface 6 and an inner region 12 close to the hub. Segments are designated with reference numerals 11 in FIG. 2. Reference numeral 13 indicates a respective rotational direction of the clutch disk 5. The segmenting allows the clutch disk 5 an unhindered radial expansion as a result of the action of the rotational speed. Moreover, a second clutch surface 6a can also be arranged in the region of a first face side 18 of the clutch disk 5, which second clutch surface cooperates with a second counter-surface 8a which is formed by a face surface of the part 7 to be driven. Denting is prevented as a result of a supporting disk 17 on a second face side 19 of the clutch disk 5, and support is enabled.

As is shown in FIG. 3, the first clutch surface 6 and/or the second clutch surface 6a and/or the respective counter-surfaces 8, 8a are provided with drainage grooves 14 which prevent a so-called "aquaplaning" effect especially when used for a water pump and which also contribute to receiving and discharging possible particles in the water circulation.

Below a predefined minimum speed and a minimum temperature the part 7 to be driven is held in a rotatable (floating) manner on the drive shaft 2 and is therefore separated from the drive shaft 2. The clutch disk 5 must run in the cold state and in the low speed range with a precisely defined gap 15, 15a between the clutch surfaces 6, 6a of the clutch disk 5 and the respective counter-surfaces 8, 8a of the part 7. If the temperature and/or the speed rises beyond the minimum value, a clutching of the clutch element 3 occurs.

A rise of the temperature produces an expansion and thus a clutching of the clutch disk 5. The softening of the material of the clutch disk which is formed by an elastomeric material for example ensures a slight expansion by centrifugal force and an early entrainment of the part 7 to be driven. A slip control at high rotational speeds can also be realized in the case of an optimal configuration of the clutch element 3.

The use of the clutch element 3 in a water pump of an internal combustion engine has the advantage that the operating temperature of the engine can be achieved very quickly and produces a respective reduction in fuel consumption. Since the impeller stands still in the warm-up phase or is entrained slowly as a result of hydrodynamic effects in the gap 15, 15a, the cold circulation of the coolant system of the internal combustion engine can be heated up more quickly. This ensures that the operating temperature of the internal combustion engine is reached at an earlier time and the full heating output is available at an early point in time.

What is claimed is:

1. A clutch element for a unit driven via a drive shaft with the clutch element comprising a temperature- and/or speed-sensitive clutch member which is rigidly connected with the drive shaft and which acts on a part of the unit to be driven depending on the temperature and/or rotational speed, with the clutch member being formed by a clutch disk whose surface forms at least one clutch surface for non-positive connection with a respective counter-surface which is formed by a surface of the part to be driven, wherein at least one clutch surface comprises at least one drainage groove, wherein a first face side of the clutch disk forms at least one second clutch surface for non-positive connection with a respective second counter-surface formed by a face surface of the part to be driven.

2. The clutch element according to claim 1, wherein an outer jacket surface of the clutch disk forms at least one first clutch surface for non-positive connection with a respective first counter-surface formed by an inner jacket surface of the part to be driven.

3. The clutch element according to claim 1, wherein the clutch disk consists of a material having a higher coefficient of thermal expansion than the drive shaft or the part to be driven.

4. The clutch element according to claim 1, wherein the clutch disk consists of an elastomer selected from the group consisting of acrylonitrile-butadiene caoutchouc, acrylate caouthouc, ethylene-propylene caoutchouc, silicone caoutchouc and fluorocaoutchouc.

5. The clutch element according to claim 4, wherein the material of the clutch disk has a Shore hardness of approximately 60 to 70.

6. The clutch element according to claim 1, wherein the clutch disk consists of a thermoplastic material.

7. The clutch element according to claim 1, wherein the clutch disk consists of a metallic material.

8. The clutch element according to claim 7, wherein the clutch disk consists of a sintered material.

9. The clutch element according to claim 8, wherein the sintered material is sintered bronze.

10. The clutch element according to claim 1, wherein the clutch disk is segmented in a circumferential direction.

11. The clutch element according to claim 10, wherein the segmenting is formed by at least one indentation which extends from the first clutch surface into an inner region of the clutch disk.

12. The clutch element according to claim 10, wherein the indentation extends from the first clutch surface into an inner region of the clutch disk in a radial manner.

13. The clutch element according to claim 10, wherein the indentation extends from the first clutch surface into an inner region of the clutch disk in a spiral manner.

14. The clutch element according to claim 1, wherein the drive shaft and the clutch disk are connected with each other in a positive-locking manner.

15. The clutch element according to claim 1, wherein a supporting disk which is rigidly connected with the drive shaft is arranged in the region of at least a second face side of the clutch disk.

16. The clutch element according to claim 1, wherein the part to be driven is held in a rotatable way on the drive shaft.

17. A clutch element for a unit driven via a drive shaft with the clutch element comprising a temperature- and/or speed-sensitive clutch member which is rigidly connected with the drive shaft and which acts on a part of the unit to be driven depending on the temperature and/or rotational speed, with the clutch member being formed by a clutch disk whose surface forms at least one clutch surface for non-positive connection with a respective counter-surface which is formed by a surface of the part to be driven, wherein at least one clutch surface comprises at least one drainage groove, wherein the clutch disk comprises an elastomer selected from the group consisting of acrylonitrile-butadiene caoutchouc, acrylate caouthchouc, ethylene-propylene caoutchouc, silicone caoutchouc and fluorocaoutchouc.

18. The clutch element according to claim 17, wherein an outer jacket surface of the clutch disk forms at least one first clutch surface for non-positive connection with a respective first counter-surface formed by an inner jacket surface of the part to be driven.

19. The clutch element according to claim 17, wherein a first face side of the clutch disk forms at least one second clutch surface for non-positive connection with a respective second counter-surface formed by a face surface of the part to be driven.

20. The clutch element according to claim 17, wherein the clutch disk consists of a material having a higher coefficient of thermal expansion than the drive shaft or the part to be driven.

21. The clutch element according to claim 17, wherein the material of the clutch disk has a Shore hardness of approximately 60 to 70.

22. The clutch element according to claim 17, wherein the clutch disk comprises a thermoplastic material.

23. The clutch element according to claim 17, wherein the clutch disk comprises a metallic material.

24. The clutch element according to claim 23, wherein the clutch disk comprises a sintered material.

25. the clutch element according to claim 24, wherein the sintered material is sintered bronze.

26. The clutch element according to claim 17, wherein the clutch disk is segmented in a circumferential direction.

27. The clutch element according to claim 26, wherein the segmenting is formed by at least one indentation which extends from the first clutch surface into an inner region of the clutch disk.

28. The clutch element according to claim 26, wherein the indentation extends from the first clutch surface into an inner region of the clutch disk in a radial manner.

29. The clutch element according to claim 26, wherein the indentation extends from the first clutch surface into an inner region of the clutch disk in a spiral manner.

30. The clutch element according to claim 17, wherein the drive shaft and the clutch disk are connected with each other in a positive-locking manner.

31. The clutch element according to claim 17, wherein a supporting disk which is rigidly connected with the drive shaft is arranged in the region of at least a second face side of the clutch disk.

32. The clutch element according to claim 17, wherein the part to be driven is held in a rotatable way on the drive shaft.

* * * * *